United States Patent Office 3,494,945
Patented Feb. 10, 1970

3,494,945
ALKYLENE BIS-IMINODITHIOCARBONIC ACID CHELATES
Sheldon N. Lewis, Willow Grove, and George A. Miller, Glenside, Pa., assignors to Rohm and Haas Company, Philadelphia, Pa., a corporation of Delaware
No Drawing. Filed Nov. 14, 1967, Ser. No. 682,982
Int. Cl. C07f 15/00, 3/00; A01n 9/12
U.S. Cl. 260—429        12 Claims

ABSTRACT OF THE DISCLOSURE

Alkylene bis-iminodithiocarbonic acid chelates of the general structure

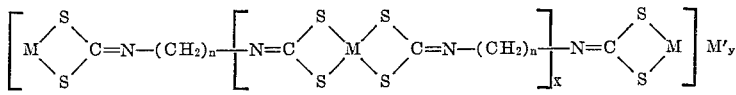

produced by reacting tetravalent salts of alkylene bis-iminodithiocarbonic acid characterized by the presence of four replaceable cations, such as tetrasodium ethylene bis-iminodithiocarbonate, with a stoichiometric amount of a transition metal salt, such as zinc acetate, either alone or mixed with another of said transition metal salts, or with a quaternary ammonium compound, useful for controlling noxious living organisms, such as fungi and bacteria which are harmful to many crops.

---

This invention relates to novel chelates of alkylene bis-iminodithiocarbonic acids, to novel tetravalent alkylene bis-iminodithiocarbonate salts which are intermediates for the chelates, to methods for their preparation, and to agricultural compositions containing them as the active ingredient. Still further, this invention relates to a method for controlling diseases of agricultural plants caused by living organisms, such as fungi and bacteria.

Although there has been a great deal of literature relating to various salts and coordinated structures derived from bis-dithiocarbamates, there is not even a remote suggestion of chelates of alkylene bis-iminodithiocarbonic acids. German Patent 1,163,802 discloses the reaction of sulfonamides, carbon disulfide and sodium hydroxide followed by alkylation to provide S,S'-dialkyliminodithiocarbonates. Finally, U.S. Patent 3,335,182 discloses the preparation of N-substituted S,S-dialkali metal iminodithiocarbonates by reacting a primary amine and carbon disulfide in the presence of an alkali metal hydroxide.

In accordance with this invention novel biocidally active chelates of alkylene bis-iminodithiocarbonic acid are produced in a reaction which comprises reacting a transition metal salt, either alone or mixed with another of said transition metal salts, or with a quaternary ammonium compound, with a novel tetravalent salt of an alkylene bis-iminodithiocarbonic acid of the formula

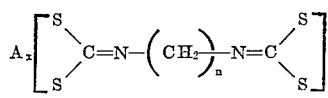

where $n$ is an integer of at least 2, preferably from 2 to 6; A is selected from an alkali metal, alkaline earth metal and quaternary ammonium group; $x$ is 2 when A is divalent and 4 when A is monovalent. The tetravalent salt is characterized by the presence of four replaceable cations. In the chelate-forming reaction, the tetravalent salt can, if desired, be dissolved in a nonprotonic solvent, such as dimethylsulfoxide. For example, zinc acetate may be reacted with tetrasodium alkylene bis-iminodithiocarbonate dissolved in dimethylsulfoxide to produce a zinc chelate of the alkylene-bis-iminodithiocarbonic acid. The reaction starting materials and the reaction product of this invention are described more fully hereinbelow.

In this invention a stoichiometric amount of the transition metal compound or quaternary ammonium starting material is reacted for each equivalent of the tetravalent salt of the alkylene bis-iminodithiocarbonic acid. For example, if the transition metal is divalent, two equivalents of the transition metal compound are reacted for each equivalent of the tetravalent salt to provide an alkylene bis-iminodithiocarbonic acid chelate believed to have the general structure (I)

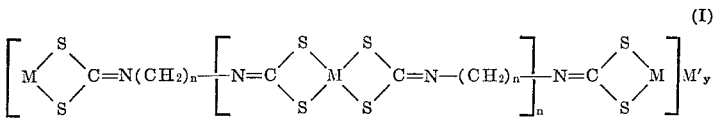

where $x$ is an integer from 1 to 100 inclusive, so that the structure may be either a monomer or a polymer; $y$ is an integer equivalent to $x$ when M' has a valence of 2 and $y$ is an integer equivalent to $2x$ when M' has a valence of 1; $n$ is an integer of at least 2, and preferably from 2 to 6, inclusive; M is a transition metal and M' is selected from the group consisting of transition metals and quaternary ammonium of the formula

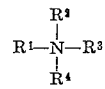

where $R^1$, $R^2$, $R^3$ and $R^4$ represent individually alkyl of 1 to 24 carbon atoms, cyclohexyl, aryl, aralkyl, alkyl-substituted benzyl wherein the alkyl is 1 to 12 carbon atoms, hydroxyalkyl of 1 to 4 carbon atoms, or hydrogen. The preferred transition metals are cadmium, cobalt, copper, iron, manganese, nickel and zinc. The lower alkyl quaternary ammonium groups having 1 to 6 carbon atoms, such as tetrabutylammonium, in addition to trimethylbenzylammonium, are convenient to use in this invention.

Formula I does not indicate an exact chemical structure. It embraces both the monomeric and polymeric structures. It is believed that the transition metal is present in two main types of bondings, viz an ionic bond (M') with the bis-iminodithiocarbonate radical and a coordinate bond (M).

The order in which the stoichiometric amounts of the transition metal compound or quaternary ammonium compound are added to the reaction medium can be varied to give a mixed-metal chelate. For example, the reaction can be carried out by a simultaneous addition of two or more transition metal salts, or by the addition of two successive single equivalent portions of different transition metal ions, such as a first addition of copper acetate and a second addition of zinc acetate. In addition, the novel chelates of this invention can be produced by reacting three different transition metal compounds, such as zinc acetate, cupric chloride and ferric chloride, either concurrently or by successive addition with the tetravalent alkylene bis-iminodithiocarbonate. Chelates formed by reacting a plurality of transition metal compounds are characterized by a board spectrum of biological end-use based on the cumulative effect of the different transition metal cations. It is also within the scope of this invention to carry out the coordinate bonding reaction by the successive or simultaneous addition of transition metal compounds having a common cation but different anions, such as zinc acetate and zinc sulfate. It is therefore possible to form chelates wherein the same metal is present in both bonding forms, or to form compounds wherein two or more different metals are used for each of the two types of bonding in the same compound. It is to be understood that the invention covers the products as made by the process described irrespective of what the exact structures may be.

The tetravalent salt of an alkylene bis-iminodithiocarbonic acid which reacts with the transition metal compound or quaternary ammonium compound is prepared in anhydrous reaction wherein an alkylenediamine, such as ethylenediamine, is reacted in a nonprotonic solvent medium, such as dimethylsulfoxide, with carbon disulfide and a metal hydride, such as an alkali metal or alkaline earth metal hydride. The most readily available metal hydride is sodium hydride. The metal of the tetravalent salt can even be replaced by a quaternary ammonium ion in a metathetical reaction. The use of a nonprotonic solvent can be avoided by using an excess of ethylenediamine or carbon disulfide as the solvent medium. It is preferred that the anhydrous reaction be conducted under mild reaction conditions, such as at room temperature. In any event, the reaction temperature should not exceed the upper decomposition limit of the reaction product. The reaction can be illustrated by the following schematic equation:

1

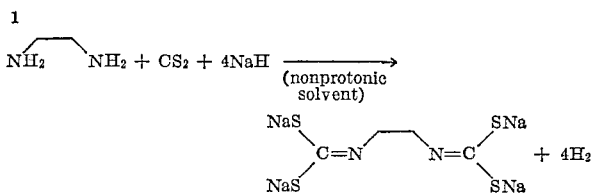

The tetravalent ethylene bis-iminodithiocarbonate is then further reacted according to the following schematic equation:

2

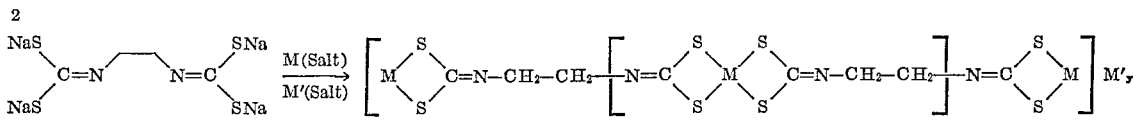

where M, M' and $x$ are as defined above.

The reactions described above may be carried out in any suitable anhydrous, highly polar, nonprontonic solvent having good solvent power for the reacting materials. Representative of some of the suitable solvents that may be used in this invention are dimethylsulfoxide, dimethyl ether of ethylene glycol, dimethyl ether of diethylene glycol, dimethyl formamide, sulfolane, etc. If desired, the transition metal compound may be added directly to a solution of the tetravalent salt of an alkylene bis-iminodithiocarbonic acid and allowed to slowly react. However, it is preferred that the reaction of the transition metal compound with the tetravalent alkylene bis-iminodithiocarbonate be carried out in one of the nonprotonic solvents described hereinabove. The most preferred nonprotonic solvent is dimethylsulfoxide.

Representative of the transition metal compounds useful in this invention are compounds that will react with the hereinabove described tetravalent alkylene bis-iminodithiocarbonate to form coordinate or ionic bonds, such as the halides, acetate, nitrate, phosphate and sulfate. It is preferred that the transition metal ions of divalent. An excess of the transition metal compound reactant based on the bis-dithiocarbonate may be used and the excessive amount is governed by economic and other considerations. For example, excesses of a metal salt, such as copper sulfate or nickel sulfate can be used. The use of such excessive amounts of salt will result in a mixture of a product of the invention with unused metal salts. A biocidally active metal compound, either alone or in admixture with other ingredients, may be added to the chelate reaction product of this invention after the reaction has been essentially completed. An excess of copper salt, which may be added to the reaction mixture or to the formed chelate reaction product, is useful for application to grapes and similar crops, while the mixture with excess nickel salt may be applied to cereal grain.

To assist those skilled in the art to practice the present invention, the following procedures are suggested by way of illustration, parts and percentages being by weight and the temperature in ° C. unless otherwise specifically noted.

(1) Preparation of tetrasodium ethylene-bis-iminodithiocarbonate

About 15.7 g. sodium hydride (67 percent dispersion in mineral oil) is placed in a 500 ml. 3-neck flask and washed free of mineral oil by three 50 ml. portions of dry xylene. To the sodium hydride is added 125 ml. of dry dimethylsulfoxide and 6.0 g. of ethylenediamine. The mixture is then stirred to form a slurry. To the stirred slurry is added dropwise at 35° C., a solution of 15.2 g. of carbon disulfide in 50 ml. of dimethyl sulfoxide. As the reaction proceeds hydrogen is evolved and at the completion of the addition 9.04 liters had evolved. A slurry of tetra-sodium ethylene bis-iminodithiocarbonate is obtained. This solution is used to prepare transition metal chelates by the metathetical reactions described hereinbelow.

(2) Zinc ethylene-bis-iminodithiocarbonate

To a slurry of tetra-sodium ethylene-bis-iminodithiocarbonate (0.1 mole) as prepared in procedure (1) described above is added a solution of 36.6 g. (0.2 mole) of anhydrous zinc acetate in 100 ml. of dimethyl sulfoxide. The addition is carried out over a 40 minute period and an exotherm to about 43° C. develops during this time. The mixture is stirred for several hours and then filtered to give about 23.7 g. sodium acetate. The filtrate is poured into about 2 liters of water to give a precipitate of about 29.6 g. of zinc ethylene-bis-iminodithiocarbonate after filtration and vacuum drying.

(3) Copper-zinc ethylene-bis-iminodithiocarbonate

To a slurry of tetra-sodium ethylene-bis-iminodithiocarbonate (0.1 mole) prepared as described in procedure (1) above is added about 18.1 g. (0.1 mole) of anhydrous copper acetate as a solid. The addition is carried out over a 5 minute period. An exotherm is developed to about 42° C. The mixture is stirred for about 12 hours and a solution of about 18.3 g. (0.1 mole) of anhydrous zinc acetate in about 75 ml. of dimethyl sulfoxide is added over a 10 minute period. A slight exotherm to about 33° C. is developed. The mixture is stirred for about 2 minutes and filtered to provide about 27.1 g. of sodium acetate. The filtrate is poured into about 2 liters of water to give a precipitate which upon filtration and drying provides about 23 g. of copper-zinc ethylene-bis-iminodithiocarbonate.

(4) Tetrabutylammonium zinc ethylene-bis-iminodithiocarbonate

To a slurry of tetra-sodium ethylene bis-iminodithiocarbonate (0.1 mole) is added about 18.3 g. (0.1 mole) of anhydrous zinc acetate as a solid. An exotherm is developed to about 38° C. The reaction mixture is stirred for about 3 hours and 66.4 g. (0.2 mole) of tetrabutylammonium bromide is added as a powder. The reaction mixture is additionally stirred for about 1 hour. The reaction solution is then poured into about 2 liters of water to give a precipitate which upon filtration and drying provides about 34.9 g. of tetrabutylammonium zinc ethylene-bis-iminodithiocarbonate.

(5) Copper ethylene-bis-iminodithiocarbonate

A final precipitate is formed in the same way as described in procedure (2) above, except copper acetate is substituted for zinc acetate.

(6) Zinc-copper ethylene-bis-iminodithiocarbonate

A final precipitate is fomed in the same way as described in procedure (3) above, except the order of the addition of copper acetate and zinc acetate is reversed.

The compounds of this invention are useful as broad spectrum fungicides. They can be applied to plants or other areas to be protected by contacting such area with a compound of this invention contained in a formulation that is suitable for dissemination as a fungicide. In certain operations, the unmodified compounds are distributed or incorporated in pesticidal amounts in adhesives, soaps, inks, plaster wallboard, cutting oils, textiles, paper, polymeric materials, paints, embalming fluids, lumber, wood products or growth media, upon the surfaces of the above-ground portion of plants or to seed germination beds to prevent the attack of various fungal pests and the subsequent economic loss due to the degradation of such products by microorganisms. However, the present method also embraces the employment of liquid or dust compositions containing the toxicants. When the compounds of this invention are used as fungicides, they may be formulated as finely divided, wettable powders, dusts and granular materials, solutions, concentrates, emulsifiable concentrates, slurries, and the like, depending upon the particular application intended and the formulation media desired. In such usage, the compounds are modified with one or a plurality of additaments or adjuvants including water, organic solvents, petroleum oils, petroleum distillates, naphthas, or other liquid carriers, polymeric thickening agents, urea, surface active dispersing agents and finely divided inert solids. When liquid formulations are employed, or dry materials prepared which are to be used in liquid form, it is desirable, in certain instances, additionally to employ a wetting, emulsifying or dispersing agent to facilitate use of the formulation. Suitable surfactants are disclosed by J. W. McCutcheon in Soap and Chemical Specialties, vol. 31, Nos. 7 to 10 (1955).

The exact concentration of the toxicants to be employed in the treating compositions is not critical and may vary considerably provided the required dosage of the effective agent is supplied to the area to be treated The concentration of toxicant in liquid compositions generally is from about 0.0001 to 50 weight percent. Concentrations up to 95 weight percent are oftentimes conveniently employed. In dusts, the concentrations of the toxicant can be from about 0.1 to 95 weight percent. In compositions to be employed as concentrates, the toxicants can be present in a concentration of from 5 to 98 weight percent. The quantity of treating composition to be applied to textiles, lumber or growth media or to the foliage of plants may vary considerably provided that the required dosage of active ingredients is applied in sufficient amounts of the finished composition adequately to cover the vegetation to be treated or to facilitate the penetration and distribution of said ingredients in and on textiles, lumber or growth media.

In the preparation of dust compositions, the toxicant products can be compounded with any of the finely divided solids, such as pyrophyllite, talc, chalk, gypsum, and the like. In such operations, the finely divided carrier is ground or mixed with the toxicant or wet with a solution of the toxicant in a volatile organic solvent. Similarly, dust compositions containing the products can be compounded with various solid surface-active dispersing agents such as fuller's earth, bentonite, attapulgite and other clays. Depending upon the proportions of ingredients, these dust compositions can be employed for the control of pests or employed as concentrates and subsequently diluted with an additional solid surface-active dispersing agent or with one of the finely divided solids enumerated above to obtain the desired amount of active ingredient in a composition adapted to be employed for the control of fungi. Also, such dust compositions when employed as concentrates can be dispersed in water, with or without the aid of dispersing agents to form spray mixtures.

Further, spray compositions can be prepared by incorporating the compounds of this invention or their liquid or dust concentrate compositions in intimate mixtures with surface-active dispersing agents such as an ionic or non-ionic emulsifying agent. Such compositions are readily employed for the control of pests, or are dispersed in liquid carriers to form diluted sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the toxicant products can be compounded with a suitable water-immiscible organic liquid and a surface-active dispersing agent to produce an emulsifiable concentrate which can be further diluted with water and oil to form spray mixtures in the form of oil-in-water emulsions. In such compositions, the carrier comprises an aqueous emulsion, i.e., a mixture of water-immiscible solvent, emulsifying agent and water. Preferred dispersing agents which can be employed in these compositions are oil-soluble and include the non-ionic emulsifiers, such as polyoxyethylene derivatives of sorbitan esters, complex ether alcohols and the like. Also, oil-soluble ionic emulsifying agents such as mahogany soaps can be used. Suitable organic liquids which can be employed in the composition include petroleum oils and distillates, toluene, liquid halohydrocarbon and synthetic organic oils. The surface-active dispersing agents are usually employed in liquid compositions in the amount of from 0.1 to 20 percent by weight of the combined weight of the dispersing agent and active compound. However, the chelates of this invention may be mixed solely with an agricultural oil without the presence of an emulsifier and applied neat.

In addition, other liquid compositions containing the desired amount of effective agent can be prepared by dissolving the toxicant in an organic liquid, such as acetone, dimethylsulfoxide, methylene chloride, chlorobenzene and petroleum distillates. The preferred organic solvent carriers are those which are adapted to accomplish the penetration and impregnation of the pest environment and particularly soil with the toxicant compounds and are of such volatility as to leave little permanent residue thereon. Particularly desirable carriers are the petroleum distillates boiling almost entirely under 400° F. at atmospheric pressure and having a flash point above 80° F.

In further embodiments, the chelates of this invention can be advantageously employed in combination with one or more pesticidal or preservative compound. In such embodiment, such pesticidal or preservative compound is employed either as a supplemental toxicant, an additament or as an adjuvant. Representative pesticidal or preservative compounds include phenolic compounds, the bisphenols and thiobisphenols; the halogenated salicylanilides, the organosulfur compounds, the carbamate compounds, the quaternary ammonium compounds, the organometallic compounds, the inorganic salts and miscellaneous other compounds, such as: zinc ethylenebisdithiocarbamate, manganese ethylenebisdithiocarbamate, the co-ordination product of zinc ion and manganese ethylenebisdithiocarbamate, phenol, cresol, trichlorophenols, tetrachlorophenols, pentachlorophenol, p-chloro-m-cresol, sodium pentachlorophenol and other sodium, potassium, etc. salts of the phenols, substituted phenols, cresols and substituted cresols, di- and tribrominated salicylanilides, 2,2'-methylenebis (3,4,6-trichlorophenol), 2,2'-thiobis(4,6-dichlorophenoxide), halogenated trifluoromethyl salicylanilide, disodium ethylenebisdithiocarbamate, sodium N-methyldithiocarbamate, zinc dimethyldithiocarbamate, 2-mercaptobenzothiasole, 3,5 - dimethyltetrahydro - 1,3,5,2H - thiadiazine-2-thione, 2,3-dinitro-1,4-dithia-anthraquinone, dodecyl pyridinium chloride, alkyl dimethyl benzyl ammonium chloride, dialkyl dimethylammonium chloride, phenylmercuric acetate, phenylmercuric oleate, phenylmercuric propionate, chloromethoxy acetoxy mercuripropane, bis-tributyl tin oxide, bis-tripropyl tin oxide, copper pentachlorophenate, copper 8-hydroxyquinolate, mercuric chloride, sodium borate, ethylmercuric chloride, 9-undecylenic acid and 10,10'-oxybisphenoxarsine.

The chelates of this invention can be applied by a low-volume technique. For example, the filtrate of procedure (2) which is a solution of a chelate in dimethylsulfoxide solvent may be used in a low-volume application so that the total carrier volume per acre is less than one gallon per acre. This low-volume mixture can be applied to a locus to be protected at a rate of from about 0.1 to about 3.0 gallons per acre.

The transition metal chelates of this invention were evaluated for biocidal activity in standard greenhouse tests. The test procedures and the results obtained are fully described hereinbelow.

SLIDE SPORE GERMINATION TESTS

The compounds prepared according to procedures (2), (3), (5) and (6) were evaluated as fungicides in the standard slide spore germination test (cf. Phytopathology, 33, 627 (1943)), utilizing spores of *Alternaria solani*, (Alt.) and *Sclerotinia fructicola* (Scl.). The values obtained for the concentration in parts per million (p.p.m.), which effectively control 50% of the spores ($ED_{50}$), are given in Table I for typical compounds having the structure of Compound I. In the table, the symbols M and M' in structure I are identified.

TABLE I.—SLIDE SPORE GERMINATION FUNGICIDE TESTS

| Compound I | | Slide Spore $ED_{50}$ (p.p.m.) | |
|---|---|---|---|
| M | M' | Alt. | Scl. |
| Zn | Zn | 50–200 | 50–200 |
| Zn | Cu | 200–1,000 | 200–1,000 |
| Cu | Zn | 10–50 | 10–50 |
| Cu | Cu | 10–50 | 10–50 |

CONTROL OF DOWNY MILDEW ON BROCCOLI

Greenhouse tests were run to determine the value of representative compounds of this invention for the control of *Peronospora parasitica*, the causal agent of downy mildew of broccoli and other crucifers. In this test, six-week old broccoli plants were sprayed with aqueous suspensions of the test chemicals, dried, then weathered in a fog chamber overnight. The dried plants were inoculated with an aqueous suspension of *Peronospora parasitica* sporangia containing 15,000 sporangia per milliter and incubated at 53° F. for about 40 hours. Plants not treated with chemicals were included for check purposes. All plants were then placed on a greenhouse bench and stored at about 7° F. to allow disease lesions to develop and 6 to 8 days later the lesions were counted. Representative compounds of this invention, such as the zinc, copper, zinc-copper and copper-zinc coordinate compounds exhibit good control of this disease. Excellent control was obtained from the coordinate compound having two equivalents of copper ion as the complex bonding material.

TESTS ON EARLY AND LATE BLIGHTS OF TOMATOES

Tests were run in which compounds representative of this invention were evaluated for the control of tomato early blight and tomato late blight. In these evaluations, tomato plants at the four-leaf stage were sprayed to run off with suspensions of the compounds under evaluation in a dosage series. The sprayed plants were then allowed to dry. The plants were then inoculated with suspensions of the disease producing fungus. For the early blight tests, the plants were inoculated with a suspension of 25,000–30,000 spores per ml. of *Alternaria solani*. For late blight tests, the plants were inoculated with a suspension of 30,000 spores per ml. of *Phytophthora infestans*. The spores were incubated by holding the inoculated plants at about 52° F. and 100% relative humidity for about 22 hours. The plants were then placed in an illuminated test room and held at about 75° F. for a period up to four days. The plants were then inspected to determine whether any disease lesions had developed. In the tests, the compounds of this invention controlled both tomato early blight and tomato late blight.

It is to be understood that changes and variations may be made without departing from the spirit and scope of the invention as defined by the appended claims.

What is claimed is:

1. An alkylene bis-iminodithiocarbonic acid chelate comprising at least one coordinately bound transition metal and an ionically bound transition metal or quaternary ammonium group.

2. A chelate as defined in claim 1 wherein at least one metal is selected from cadmium, cobalt, copper, iron, manganese, nickel and zinc.

3. A tetravalent salt of alkylene bis-iminodithiocarbonic acid of the formula

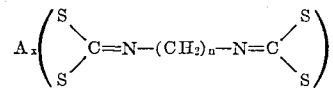

where $n$ is an integer of at least 2; A is selected from an alkali metal, an alkaline earth metal and a quaternary ammonium group; $x$ is the integer 2 when A is divalent and the integer 4 when A is monovalent.

4. A chelate as represented in claim 1 of the formula

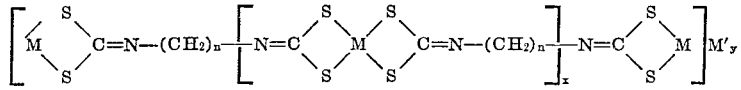

where $n$ is an integer of at least 2; $x$ is an integer of 1 to 100; $y$ is an integer equivalent to $x$ when M' has a valence of 2 and $y$ is an integer equivalent to $2x$ when M' has a valence of 1; M is at least one transition metal; and M' is selected from a transition metal and a quaternary ammonium group.

5. A chelate as defined in claim 4 wherein M and M' are selected from cadmium, cobalt, copper, iron, manganese, nickel and zinc.

6. A chelate as defined in claim 4 wherein $n$ is an integer from 2 to 6.

7. A process for producing a chelate of alkylene bis-iminodithiocarbonic acid comprising reacting a tetravalent salt of alkylene bis-iminodithiocarbonic acid of the formula of claim 3 with a transition metal compound.

8. A process as defined in claim 7 comprising the additional step of incorporating a quaternary ammonium compound into the reaction mixture.

9. A process as defined in claim 7 wherein the tetravalent salt is dissolved in a nonprotonic solvent.

10. A process as defined in claim 9 wherein the nonprotonic solvent is dimethylsulfoxide.

11. A process as defined in claim 7 wherein the cation of the tetravalent salt is selected from an alkali metal, an alkaline earth metal, and a quaternary ammonium group.

12. A process as defined in claim 7 wherein the transition metal is selected from cadmium, cobalt, copper, iron, manganese, nickel and zinc.

References Cited

UNITED STATES PATENTS 3,335,182   8/1967   Curtis et al. _____ 260—566

DELBERT E. GANTZ, Primary Examiner

A. P. DEMERS, Assistant Examiner

U.S. Cl. X.R.

260—429.9, 438.1, 439, 566 999; 424—287, 289, 294, 295 301